US007024665B2

(12) United States Patent
Ferraz et al.

(10) Patent No.: US 7,024,665 B2
(45) Date of Patent: Apr. 4, 2006

(54) CONTROL SYSTEMS AND METHODS FOR TRANSLATING CODE FROM ONE FORMAT INTO ANOTHER FORMAT

(75) Inventors: William Duarte Ferraz, Sertaozinho (BR); Flavio Henrique Jose De Souza, Sertaozinho (BR)

(73) Assignee: Smar Research Corporation, Holbrook, NY (US)

( * ) Notice: Subject to any disclaimer, the term of this patent is extended or adjusted under 35 U.S.C. 154(b) by 448 days.

(21) Appl. No.: 10/201,826

(22) Filed: Jul. 24, 2002

(65) Prior Publication Data

US 2004/0019391 A1    Jan. 29, 2004

(51) Int. Cl.
G06F 9/45 (2006.01)
(52) U.S. Cl. ........................................ 717/136; 700/18
(58) Field of Classification Search ........ 717/120–123, 717/136–137; 700/266, 286, 18
See application file for complete search history.

(56) References Cited

U.S. PATENT DOCUMENTS

| 5,801,942 | A |  | 9/1998 | Nixon et al. |
| 5,828,851 | A |  | 10/1998 | Nixon et al. |
| 5,862,052 | A |  | 1/1999 | Nixon et al. |
| 5,909,368 | A |  | 6/1999 | Nixon et al. |
| 5,995,916 | A |  | 11/1999 | Nixon et al. |
| 6,021,357 | A |  | 2/2000 | Peterson |
| 6,032,208 | A |  | 2/2000 | Nixon et al. |
| 6,098,116 | A |  | 8/2000 | Nixon et al. |
| 6,195,591 | B1 |  | 2/2001 | Nixon et al. |
| 6,266,726 | B1 |  | 7/2001 | Nixon et al. |
| 6,298,454 | B1 |  | 10/2001 | Schleiss et al. |
| 6,369,836 | B1 | * | 4/2002 | Larson et al. ............... 715/763 |
| 6,467,079 | B1 | * | 10/2002 | Ettritch et al. .............. 717/108 |
| 2004/0243654 | A1 | * | 12/2004 | Burr et al. .................. 708/164 |

OTHER PUBLICATIONS

SMAR Fieldbus Tutorial: How Fieldbus Works, pp. 1-26, publication date Feb. 2000.

* cited by examiner

*Primary Examiner*—Kakali Chaki
*Assistant Examiner*—Lawrence Shrader
(74) *Attorney, Agent, or Firm*—Dorsey & Whitney LLP (57) ABSTRACT

A control system and method for translating code from one format to another format are provided. In particular, code can be received from at least one field device. In particular, the code is received in a first format, and the received code is translated into a second format when the first format is different than the second format. For example, the second format can have a format of a Function Block Logic language, such as Foundation Fieldbus Function Block Logic language, and the first format can have a format of a non-Function Block Logic language, such as an IEC 61131-x language.

52 Claims, 10 Drawing Sheets

| | 60b | | | | | | | |
|---|---|---|---|---|---|---|---|---|
| 0 | 0 | 0 | 0 | 0 | 0 | 0 | 0 | 0 |
| 100 | 100 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 100 | 97 | 100 | 0 | 0 | 0 | 0 | 0 | 0 |
| 0 | 98 | 0 | 0 | 0 | 0 | 0 | 0 | 0 |
| 0 | 99 | 0 | 0 | 0 | 0 | 0 | 0 | 0 |
| 0 | 100 | 0 | 0 | 0 | 0 | 0 | 0 | 0 |
| 1 | 100 | 100 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |

CONTROL SYSTEMS AND METHODS FOR TRANSLATING CODE FROM ONE FORMAT INTO ANOTHER FORMAT

FIELD OF THE INVENTION

The present invention relates generally to control systems and methods for translating code from one format into another format. In particular, the present invention is directed to a system and method in which an interface arrangement receives code from a field device in any format, and translates the code into a predetermined format when the received code is in format other than the predetermined format.

BACKGROUND OF THE INVENTION

Conventional control systems may include a plurality of field devices e.g., smart field devices positioned at various locations on a network. The smart field devices may include a processor, and can be temperature sensors, pressure sensors, flow rate sensors, valves, switches, etc. or combinations thereof. The smart field devices may be communicatively coupled to each other using an open smart communications protocol. Such open smart communications protocols may include HART®, PROFIBUS®, FOUNDATION® Fieldbus, etc. These open smart communications protocols enable smart field devices that are manufactured by different manufactures to be used together in the same control system (e.g., on the same network). The conventional control systems also may include a controller communicatively coupled to each of the smart field devices using the open smart communications protocol. Moreover, the controller may receive data from each of the smart field devices.

In operation, each smart field device can perform a function on the network. For example, a temperature sensor may measure a temperature of a liquid, a pressure sensor may measure pressure within a container, a flow rate sensor may measure a flow rate of the liquid, etc. Similarly, valves and switches may be opened to allow or increase the flow of the liquid, or can be closed to stop the flow of the liquid or decrease the flow rate of the liquid. After the smart field devices obtain measurements of various process parameters, or after the valves or switches are opened/closed, the smart field devices may communicate with the controller. For example, the smart field devices may forward code which includes the data to the controller, and the controller can implement a control procedure on the network based on the received code.

Specifically, in the conventional control systems, the controller can be adapted to configure and/or monitor the field devices using the Foundation Fieldbus Function Block language, in which each function block is a subroutine of an overall control procedure. Such controller operates in conjunction with other function blocks to implement control loops within the network. Alternatively, the controller can be adapted to implement the control procedure using an IEC 61131-x language, such as a Ladder Logic language, Sequential Function Chart language, Instruction List language, etc. When the Ladder Logic language is used, the controller is configured to implement the control process procedure based on a plurality of horizontal Ladder Logic statements referred to as "rungs." Each rung defines a relationship between variables, such as between an output variable and an input variable. For example, a simple rung may indicate that a particular output variable is "ON" if variables A and B also are turned "ON." For example, the Ladder Logic programs may be expressed in terms of Ladder Logic graphs that include input symbols, line segments, and output symbols. A complete ladder logic program may be recorded on a magnetic tape or disk, and subsequently may be uploaded to a memory of the controller.

Nevertheless, in the conventional control systems, in order to implement the control procedure on the network, each of the devices in such system must be configured using the same programming language. For example, the controller and each of the field devices can be configured using the Ladder Logic language. The Ladder Logic language may be usable for implementing binary logic within the network. However, the Ladder Logic language may not be usable for implementing an analog control within the network.

SUMMARY OF THE INVENTION

Therefore, a need has arisen to provide a control system and method for translating code from one format into another format which overcome the above-described and other shortcomings of the conventional systems and methods.

One of the advantages of the present invention is that the system and method can control and/or monitor field devices even though the devices in the control system can possibly be configured using different programming languages. For example, if a particular field device is implementing binary logic within the network of the field devices, this field device can be configured using the IEC 61131-x language, such as the Ladder Logic language. Nevertheless, if another field device is implementing the analog control within the network of the field devices, this field device can be configured using a Function Block language, such as a Foundation Fieldbus Function Block language. Moreover, the system may include an interface apparatus adapted to receive code from the field devices in various formats. Specifically, the interface apparatus can translate the code into a predetermined format (e.g., from a first format into a second format) when the received code is in a format other than the predetermined format (e.g., the second format). For example, the predetermined format (and/or the second format) can have a format of the Foundation Fieldbus Function Block language. The first format can be a non-Function Block Logic language, such as the IEC 61131-x language. Moreover, the IEC 61131-x language may be the Ladder Logic language, the Sequential Function Chart language, and/or the Instruction List language.

In another exemplary embodiment of the present invention, the interface arrangement can generate a graphical expression of the received code. The graphical expression includes a plurality of cells, and each of the cells includes a single element or no elements. For example, the element can be a line segment or a variable, and the variable can be an input variable or an output variable. Moreover, the interface arrangement can generate a matrix associated with the graphical expression. Specifically, the interface arrangement may replace those cells which do not include an element with the number 0, replace those cells which include the line segment element with the number 1, and replace those cells that include a variable which is not connected vertically to another variable with the number 100. The interface arrangement can also replace those cells which include a variable that is connected vertically to another variable with the number (N), in which the number (N) equals to 100 minus the number variables connected to (and positioned below) that particular variable. Moreover, the interface arrangement may further be adapted to solve the matrix, and to translate the code received from the first format into the second format based on a solution of the matrix. For example, the interface arrangement can solve the matrix using Boolean algebra.

In yet another exemplary embodiment of the present invention, a controller may be communicatively coupled to the field device, with the controller and/or the field device including the interface arrangement. Moreover, the field device can be a smart field device, and the controller can be communicatively coupled to the smart field device using an open smart communications protocol. The smart communications protocol can be a Foundation Fieldbus protocol, a PROFIBUS protocol, etc. Further, the field device may be a temperature sensor, a pressure, sensor, a flow rate sensor, a valve, a switch, etc., or combinations thereof.

In still yet another exemplary embodiment of the present invention, a computer arrangement is communicatively coupled to the controller and/or to the field device. The computer system may receive data from the controller and/or the field device. The data can include values associated with measurements performed by the field device, such as a temperature, a pressure, and/or a flow rate. The data also can include the amount of time that the field device has been in operation, a position of a valve, and/or a position of a switch at various times during the operation of the field device.

BRIEF DESCRIPTION OF THE DRAWINGS

For a more complete understanding of the present invention, the needs satisfied thereby, and the objects, features, and advantages thereof, reference now is made to the following descriptions taken in connection with the accompanying drawings.

FIG. 8b is a detailed flowchart of a matrix generation step of the method of FIG. 8a.

DETAILED DESCRIPTION

Exemplary embodiments of the present invention and their advantages may be understood by referring to FIGS. 1–8b, like numerals being used for like corresponding parts in the various drawings.

Figure 1:
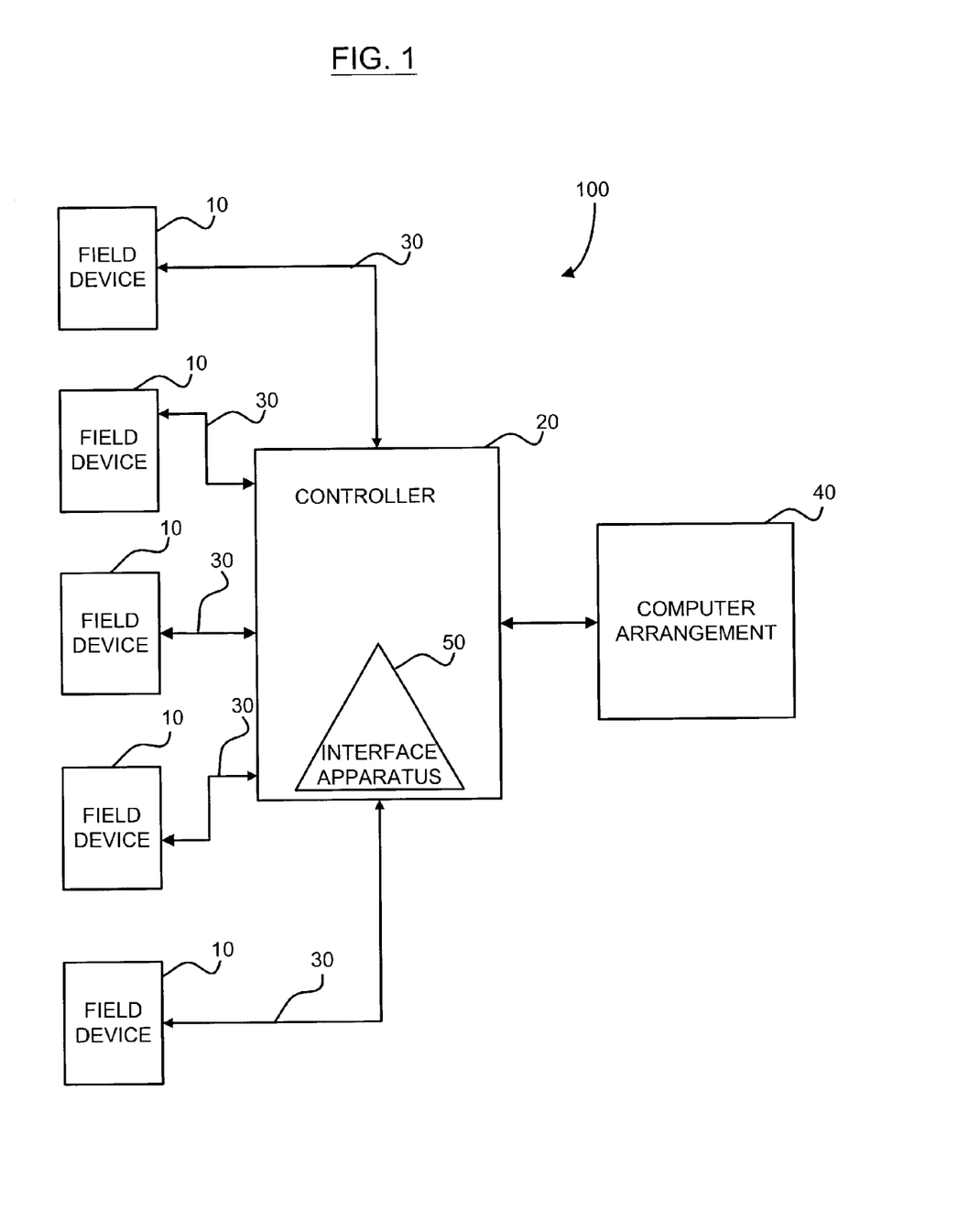
FIG. 1 is a block diagram of a first exemplary embodiment of a control system according to the present invention.
Figure 2:
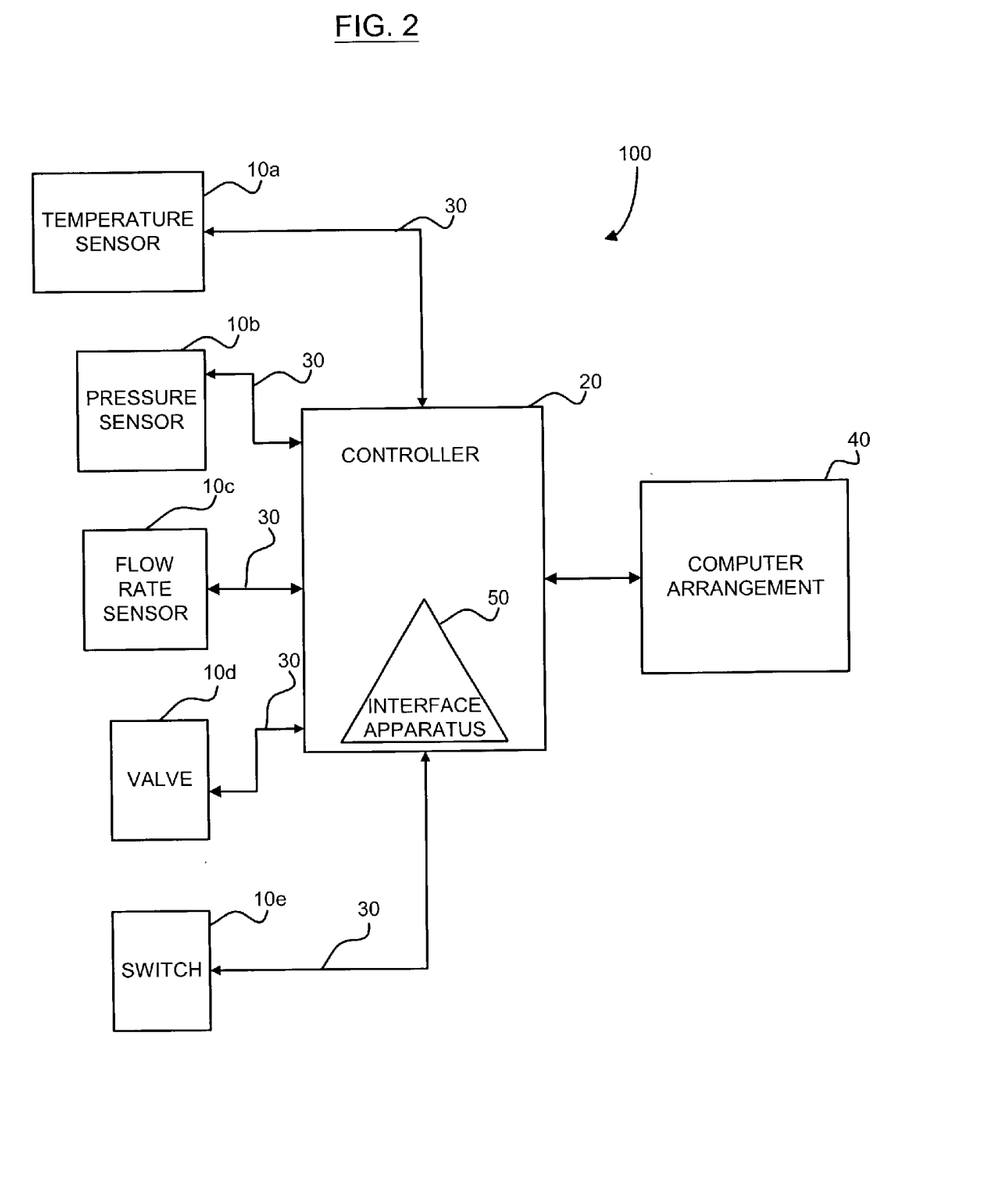
FIG. 2 is a block diagram of a second exemplary embodiment of the control system according to the present invention.

FIG. 1 shows a first exemplary embodiment of a control system 100 according to the present invention. The system 100 may include at least one field device 10 (e.g., at least one smart field device) positioned on a network (e.g., a Fieldbus network, and each field device 10 may include a processor (not shown). In many instances there are a plurality of field devices connected to the network. Referring to FIG. 2, which shows a second exemplary embodiment of the system 100 of the present invention, each of the smart field devices 10 may be a sensor, a control element, etc. The sensor may be a temperature sensor, a pressure sensor, a flow rate sensor, etc., and the control elements can be a valve, a switch, etc. In operation, each of the field devices 10 may perform a function within the system 100. For example, a field device 10a which is a temperature sensor may measure a temperature of a liquid, a field device 10b which is a pressure sensor may measure pressure within a container, a field device 10c which is a flow rate sensor may measure a flow rate of the liquid, etc. Similarly, field devices 10d, 10e which are a valve and a switch, respectively, may open to allow for or increase the flow rate of the liquid, and/or may close to stop the flow of the liquid or to decrease the flow rate of the liquid. In another exemplary embodiment of the system according to the present invention, each field device 10 may be communicatively coupled to at least one other field device 10 using an open smart communications protocol 30. Such open smart communications protocols may be HART® protocol, PROFIBUS® protocol, FOUNDATION® Fieldbus protocol, etc.

Referring again to FIG. 1, the system 100 may also include a controller 20. The controller 20 may have a processor (not shown), and can also be communicatively coupled to each field device 10 using the open smart communications protocol 30. The system 100 may further include a computer arrangement 40 (e.g., a Pentium® processor-based computer) communicatively coupled to the controller 20. The computer system 40 may be communicatively coupled to the controller 20 using an Ethernet connection, LAN connection, etc. In operation, each of the smart field devices 10 may collect data associated with a function block of that particular field device 10. For example, in a case when the field device 10 is a sensor, the data may include values associated with instantaneous temperatures, pressures, flow rates, etc. that are detected by such field device 10 at various times. When the field device 10 is a control element, the data may include values associated with a position or status of the field device 10 at various times. Moreover, when the field device 10 is a sensor or a control element, the data may further include values associated with historical data, e.g., the amount of time that the field device 10 has been in operation.

The system 100 may also include an interface apparatus 50. For example, the controller 20 and/or the field device 10 may include therein the interface apparatus 50. In operation, the interface apparatus 50 may be adapted to receive code from the field device 10, with the code possibly including the collected data. The interface apparatus 50 may determine whether a format (e.g., a language format) of the received code is the same as a predetermined format (e.g., a particular language format), and then translate the received code into the predetermined format when the format of the received code is different than the predetermined format. For example, the predetermined format can be a Function Block Logic language format, such as Foundation Fieldbus Function Block Logic language, and the format of the received code can be a non-Function Block Logic language format, such as an IEC 61131-x language format. Moreover, the IEC 61131-x language can be a Ladder Logic language, a Sequential Function Chart language, an Instruction List language, etc. Alternatively, the interface apparatus 50 can translate the received code into the predetermined format without initially determining whether the format of the received code is different than the predetermined format. In such case, the translation of the received code occurs automatically.

Figure 3:
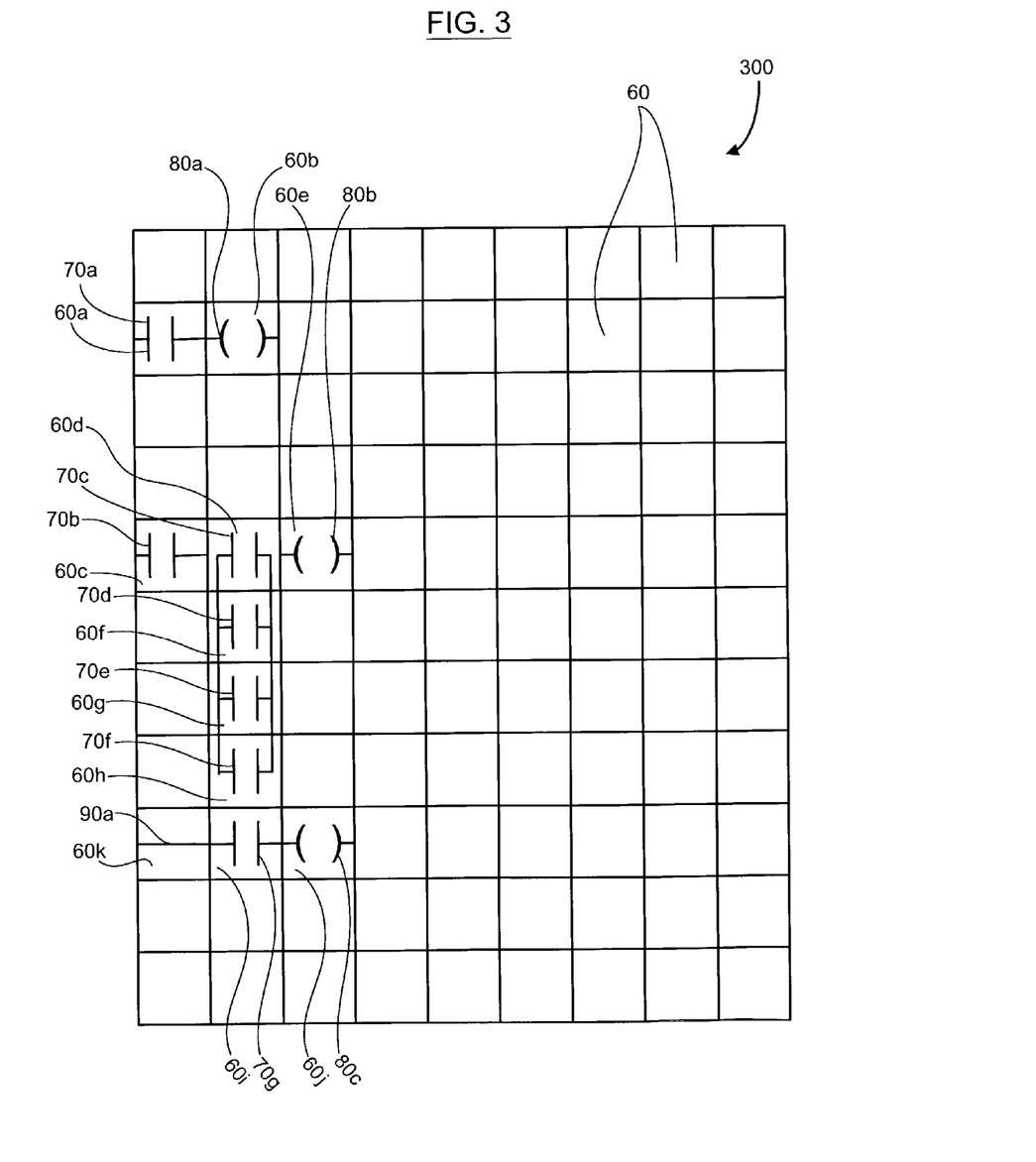
FIG. 3 is a block diagram of an exemplary embodiment of a graphical expression of a sample code according to the present invention which may be received by the control system of FIGS. 1 and 2.
Figure 4:
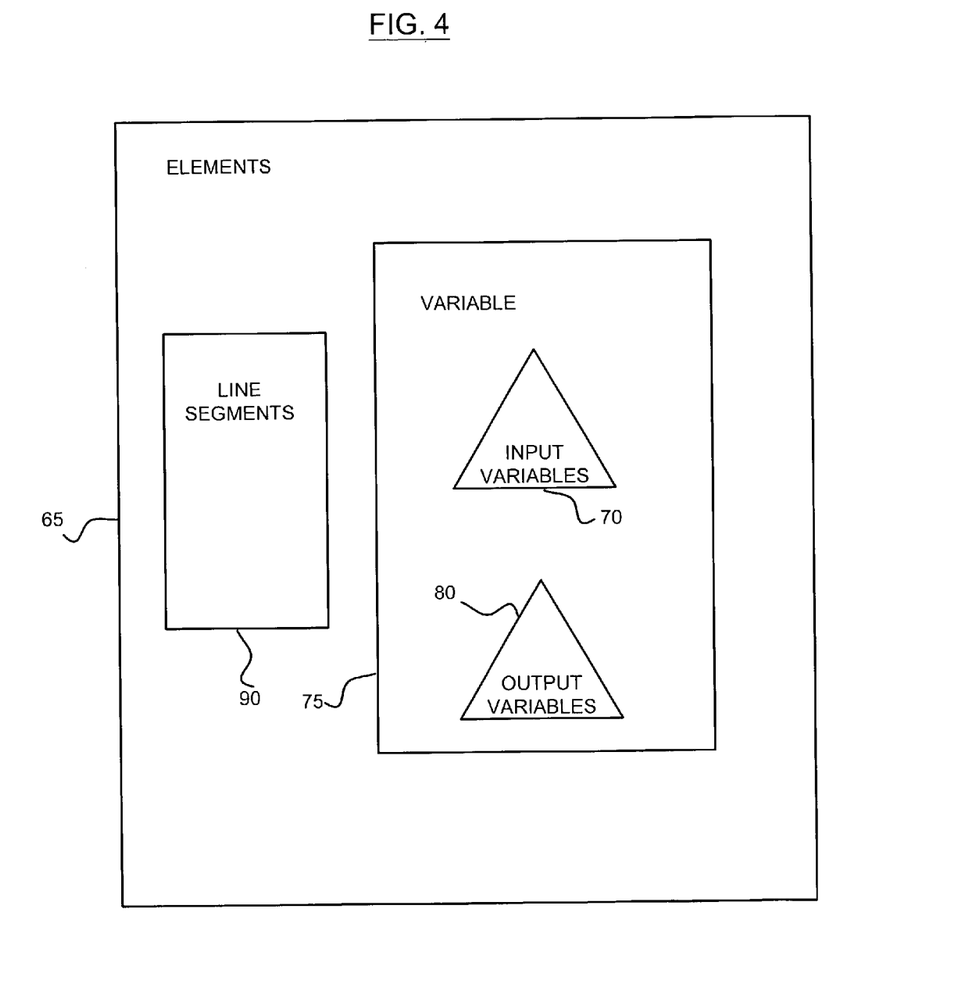
FIG. 4 is a block diagram of exemplary elements of the graphical expression of FIG. 4b.
Figure 5:
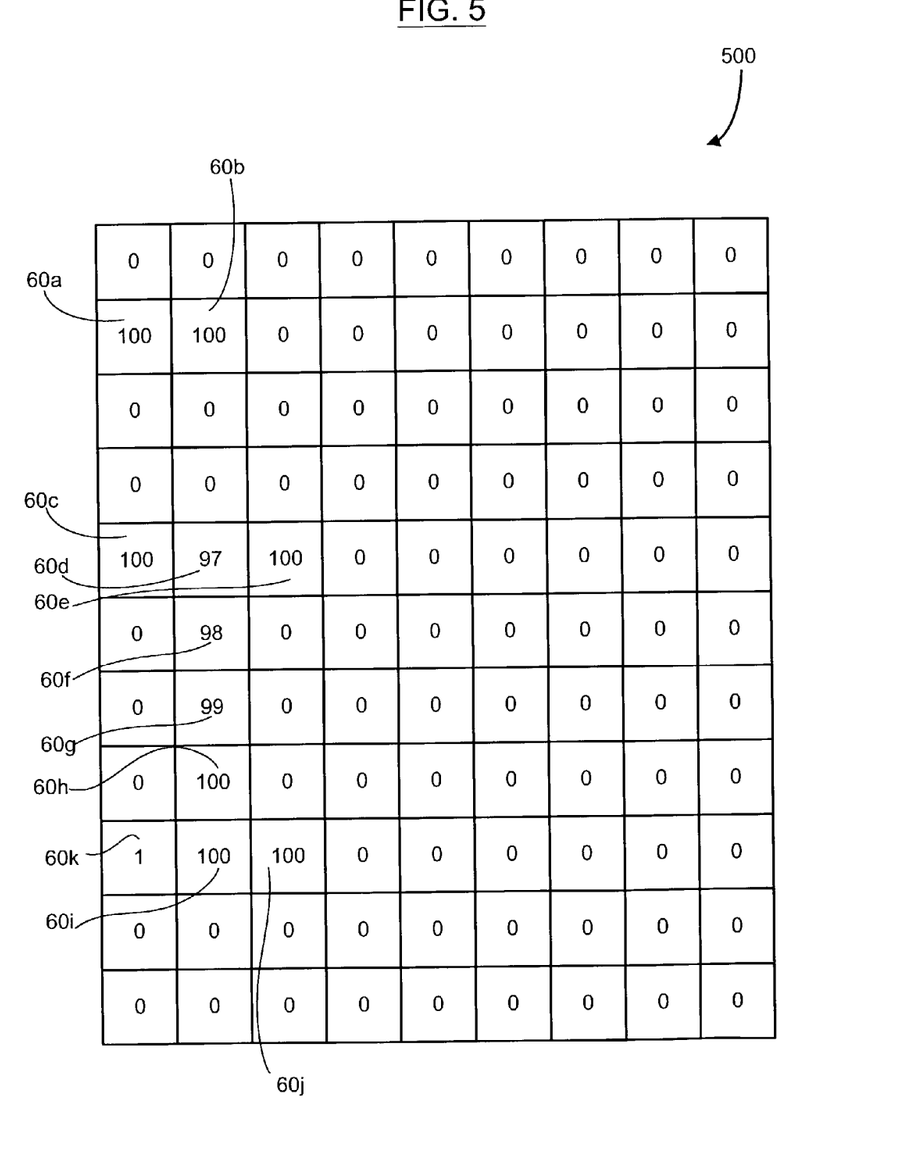
FIG. 5 is a block diagram of an exemplary embodiment of a matrix associated with the graphical expression of FIG. 3 according to the present invention.

Referring to FIGS. 3 and 4, in another exemplary embodiment of the present invention, the interface arrangement 50 is further adapted to generate a graphical expression 300 of the received code. The graphical expression 300 includes a plurality of cells 60, and each of the cells 60 includes a single element 65 or no elements. For example, the element 65 can be a line segment 90 or a variable 75, and the variable 75 can be an input variable 70 or an output variable 80. Methods for generating a graphical expression of a code which is in a particular format (e.g., methods of generating a graphical expression of a code which is in a format of any of the IEC 61131-x languages) are known in the art, and therefore shall not be further described hereinbelow. Referring to FIG. 5, the interface arrangement 50 may be further adapted to generate a matrix 500 that is associated with the graphical expression 300. Specifically, the interface arrangement 50 may replace those cells 60 which do not include an element 65 with the number 0, those cells 60 which include the line segment 90 with the number 1, and those cells 60 that include the variable 75 which is not connected vertically to another variable 75 with the number 100. The interface arrangement 50 also can replace those cells 60 that include the variable 75 which is connected vertically to another variable 75 with the number (N). In particular, the number (N) equals 100 minus the number of the variables 75 connected to (and positioned below) that particular variable 75.

FIG. 3 shows an example of the generated graphical expression 300 of the received code. In this example, a first cell 60a of the graphical expression 300 includes a first input variable 70a, a second cell 60b includes a first output variable 80a, a third cell 60c includes a second input variable 70b, a fourth cell 60d includes a third input variable 70c, and a fifth cell 60e includes a second output variable 80b. Moreover, a sixth cell 60f includes a fourth input variable 70d, a seventh cell 60g includes a fifth input variable 70e, an eighth cell 60h includes a sixth input variable 70f, a ninth cell 60i includes a seventh input variable 70g, a tenth cell 60j includes a third output variable 80c, and an eleventh cell 60k includes a first line segment 90a. Further, the third, fourth 70d, fifth 70e, and sixth input variable 70c, 70d, 70e, and 70f are vertically connected to one other, and the remaining cells 60 not identified hereinabove are empty (i.e., do not include any element).

Referring again to FIG. 5, an example of a matrix 500 associated with the graphical expression 400 of the received code is provided. In this exemplary matrix 500, the cells 60 which do not include an element 65 are replaced by the number 0, and the eleventh cell 60k (which has the line segment 90a) is replaced by the number 1. Moreover, the first cell 60a, second cell 60b, third cell 60c, fifth cell 60e, ninth cell 60i, and tenth cell 60j are each replaced by the number 100. Specifically, those cells 60a, 60b, 60c, 60e, 60i, 60j include one of the variables 75 which is not vertically connected to another one of the variables 75. Further, the fourth cell 60d, sixth cell 60f, seventh cell 60g, and eighth cell 60h are replaced by the numbers 97, 98, 99, and 100 respectively. Specifically, the fourth cell 60d includes one of the variables 75, with three of other variables 75 being connected to (and positioned below) the fourth cell 60d. Thus, starting with the number 100, the quantity of the variables connected to the vertically positioned cell (in this case–3) is subtracted therefrom to provide a result (i.e., 100–3=97). Similarly, the sixth cell 60f includes one of the variables 75, with two of the variables 75 connected to (and positioned below) the sixth cell 60f (i.e., thus yielding the following result: 100–2=98). The process is the same for the seventh cell 60g and the eighth cell 60h, which produce the numbers 99 and 100, respectively.

In yet another exemplary embodiment of the present invention, the interface arrangement 50 may further be adapted to solve the matrix 500, and to translate the code received in the first format into the second format based on a solution of the matrix 500. For example, the interface arrangement 50 can solve the matrix 500, cell by cell, using Boolean algebra.

Figure 6:
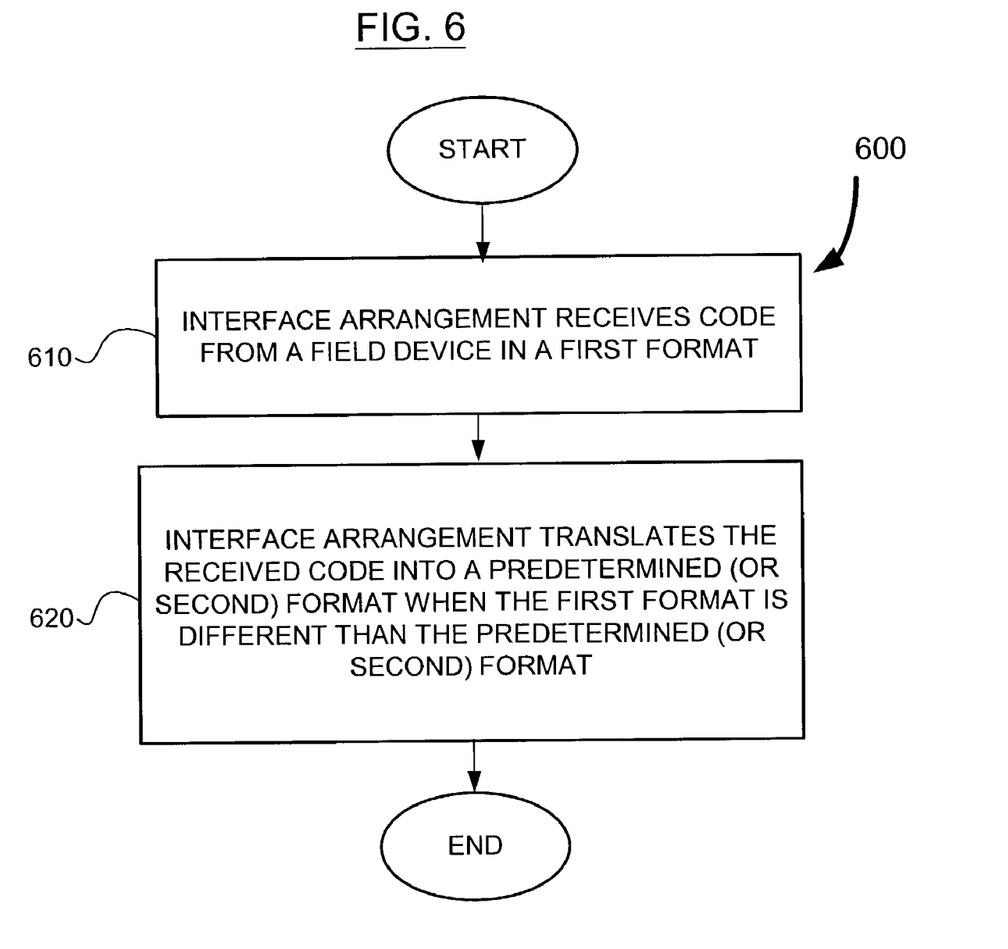
FIG. 6 is a top level flowchart of a first exemplary embodiment of a method according to the present invention for translating the code from one format into another format.

FIG. 6 shows a top level flow chart of a first exemplary embodiment of a method 600 according to the present invention which can be utilized by the system 100 of FIGS. 1 and 2. In step 610, the interface arrangement 50 receives the code from the field device 10 in the first format. In step 620, the interface arrangement 50 translates the received code into the predetermined (or second) format when the first format is different than the predetermined (or second) format.

Figure 7A:
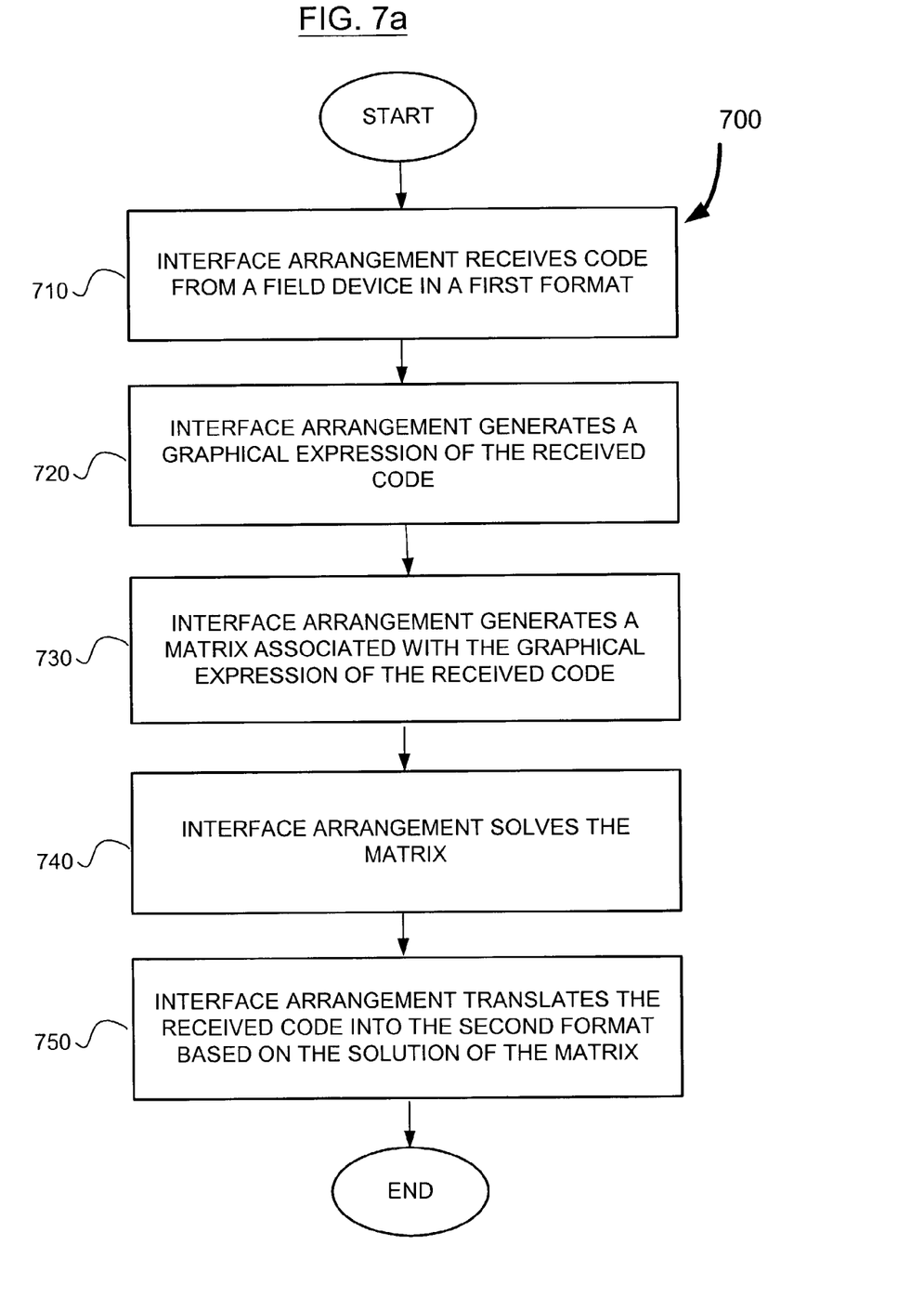
FIG. 7a is a top level flowchart of a second exemplary embodiment of the method according to the present invention for translating the code from one format into another format.
Figure 7B:
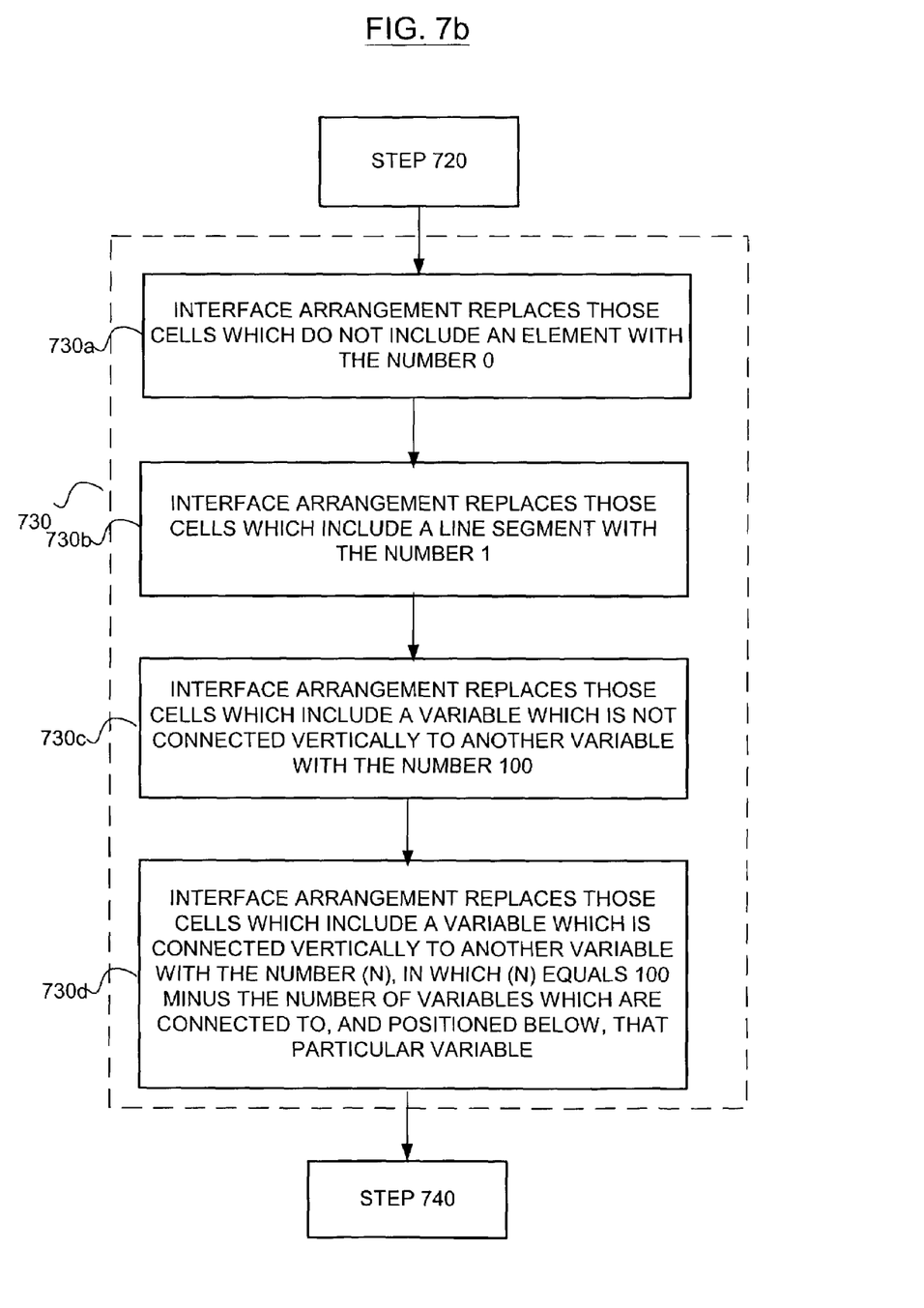
FIG. 7b is a detailed flowchart of a matrix generation step of the method of FIG. 7a in which a matrix is generated so as to be associated with the code received by the control system.

FIG. 7a shows a top level flow chart of a second exemplary embodiment of the method 700 according to the present invention which can also be utilized by the system 100 of FIGS. 1 and 2. In step 710, the interface arrangement 50 receives the code from the field device 10 in the first format, and in step 720, the interface arrangement 50 generates the graphical expression 300 of the received code. In step 730, the interface arrangement 50 generates the matrix 500 associated with graphical expression of the received code. Referring to FIG. 7b, a detailed exemplary flow diagram of a matrix generation step 730 is depicted. In particular, the interface arrangement 50 replaces those cells 60 which do not include an of the elements 65 with the number 0 in step 730a. In step 730b, the interface arrangement 50 replaces those cells 60 which include the line segment 90 with the number 1. Then in step 730c, the interface arrangement 50 replaces those cells 60 that include the variable 75 which is not connected vertically to another one of the variables 75 with the number 100. Further, the interface arrangement 50 replaces those cells 60 that include the variable 75 which is connected vertically to another one of the variables 75 with the number (N) (step 730d). As discussed in great detail above, the number (N) equals to 100 minus the number of the variables 75 which are connected to (and positioned below) that particular variable 75. In step 740, the interface arrangement 50 solves the matrix 500, and in step 750, it translates the received code to be in the predetermined format based on the solution of the matrix 500.

Figure 8A:
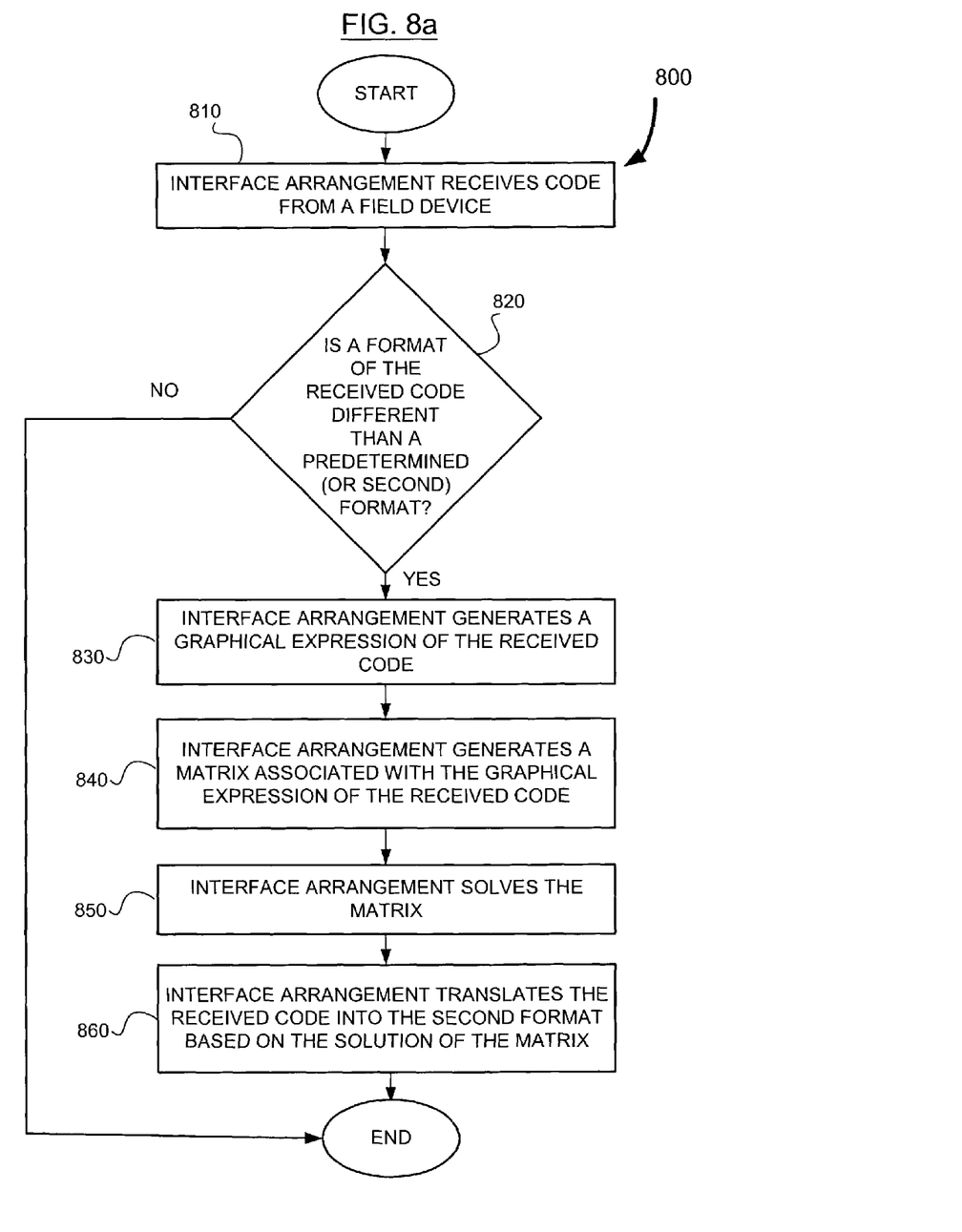
FIG. 8a is a top level flowchart of a third exemplary embodiment of the method according to the present invention for translating code from one format into another format.
Figure 8B:
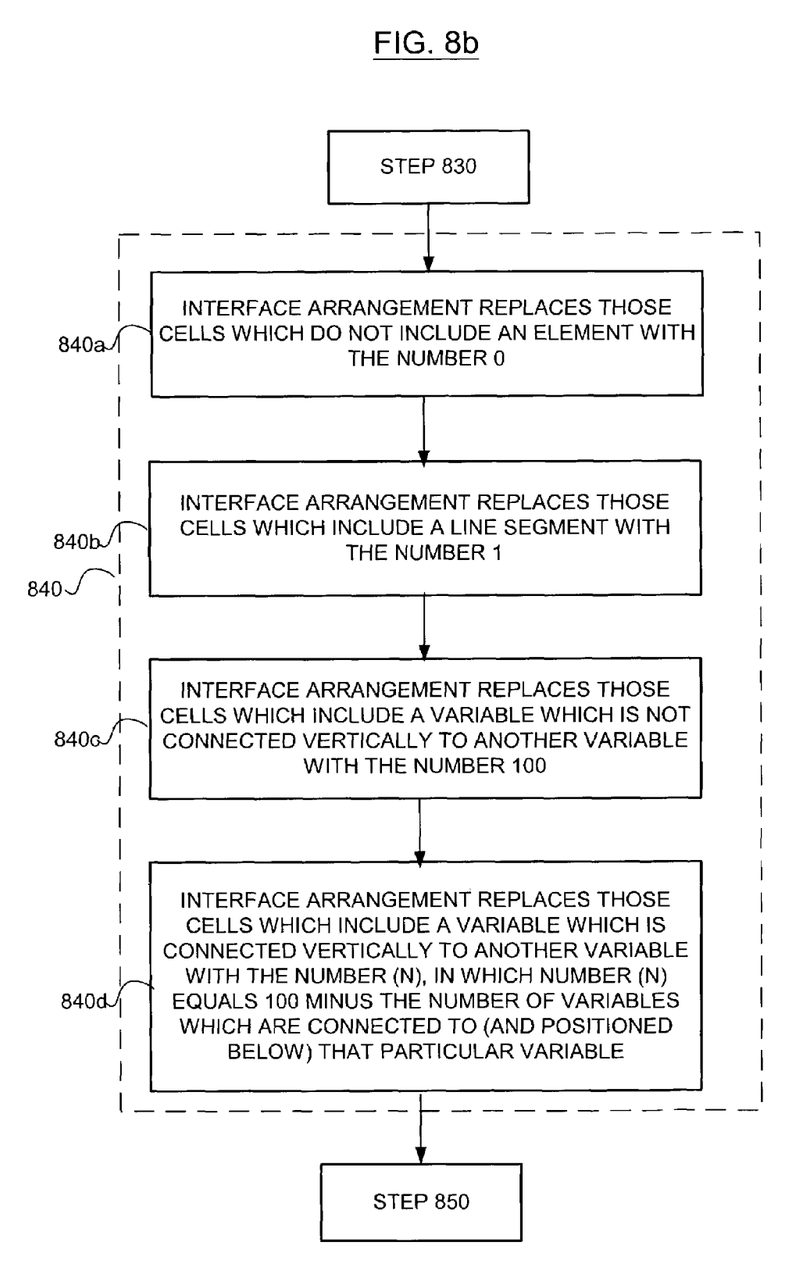

FIG. 8a shows a third exemplary embodiment of the method 800 according to the present invention which can be used by the system 100 of FIGS. 1 and 2. In step 810, the interface arrangement 50 receives the code from the field device, and in step 820, the interface arrangement 50 determines whether the format of the received code is different than the predetermined (or second) format. In step 830, the interface arrangement 50 generates the graphical expression 300 of the received code when the format of the received code is different from the predetermined format. In step 840, the interface arrangement 50 generates the matrix 500 associated with graphical expression 300 of the received code. FIG. 8b shows a detailed exemplary flow diagram of the matrix generation step 840 of FIG. 8a. In step 840a, the interface arrangement 50 replaces those cells 60 which do not include any elements with the number 0, and in step 840b, the interface arrangement 50 replaces those cells 60 which include the line segment 90 with the number 1. Moreover, in step 840c, the interface arrangement 50 replaces those cells 60 that include a variable 75 (which is not connected vertically to another one of the variables 75) with the number 100. In step 840d, the interface arrangement 50 replaces those cells 60 that include the variable 75 (which is connected vertically to another of the variables 75) with the number (N), in which the number (N) equals to 100 minus the number of the variables 75 that are connected to (and positioned below) such particular variable 75. In step 850, the interface arrangement solves the matrix 500, and in step 860, the interface arrangement 300 translates the received code into the predetermined format based on the solution of the matrix 500.

While the invention has been described in connection with preferred embodiments, it will be understood by those of ordinary skill in the art that other variations and modifications of the preferred embodiments described above may be made without departing from the scope of the invention. Other embodiments will be apparent to those of ordinary skill in the art from a consideration of the specification or practice of the invention disclosed herein. It is intended that the specification and the described examples are considered as exemplary only, with the true scope and spirit of the invention indicated by the following claims.

What is claimed is:

1. A control system, comprising:
   an interface arrangement adapted to receive code from at least one field device, wherein the interface arrangement receives the code in a first format, and translates the received code into a second format when the first format is different than the second format.

2. The system of claim 1, wherein the first format has a format of a first programming language, and the second format has a format of a second programming language.

3. The system of claim 2, wherein the first programming language is a non-Function Block Logic language.

4. The system of claim 3, wherein the non-Function Block Logic language is an IEC 61131-x language.

5. The system of claim 4, wherein the IEC 61131-x language is at least one of a Ladder Logic language, a Sequential Function Chart language, and an Instruction List language.

6. The system of claim 2, wherein the second programming language is a Function Block Logic language.

7. The system of claim 6, wherein the Function Block Logic language is a Foundation Fieldbus Function Block Logic language.

8. The system of claim 7, wherein the first programming language is an IEC 61131-x language.

9. The system of claim 8, wherein the IEC 61131-x language is at least one of a Ladder Logic language, a Sequential Function Chart language, and an Instruction List language.

10. The system of claim 2, wherein the interface arrangement is further adapted to generate a graphical expression of the received code in a format of the first programming language, and wherein the graphical expression comprises a plurality of cells, each of the cells including one of a single element and no elements.

11. The system of claim 10, wherein the element is at least one of a line segment and a variable.

12. The system of claim 11, wherein the variable is at least one of an input variable and an output variable.

13. The system of claim 11, wherein the interface arrangement is further adapted to generate a matrix associated with the graphical expression by:
   replacing first cells which do not comprise the single element having a number 0,
   replacing second cells which include the line segment with a number 1,
   replacing third cells which include a variable that is not virtually connected to another variable with a number 100, and
   replacing fourth cells which include a variable vertically connected to another variable with a number (N), and
   wherein the number (N) equals to 100 minus a quantity of variables connected to and positioned below the variable which is vertically connected to another variable.

14. The system of claim 13, wherein the first programming language is a Ladder Logic language.

15. The system of claim 13, wherein the interface arrangement is further adapted to solve the matrix, and translate the received code from first programming language into the second programming language based on the solution of the matrix.

16. The system of claim 15, wherein the interface arrangement solves the matrix using boolean algebra.

17. The system of claim 1, further comprising a controller communicatively coupled to the at least one field device, wherein at least one of the controller and the at least one field device include the interface arrangement.

18. The system of claim 17, wherein the at least one field device is a smart field device, and wherein the controller is communicatively coupled to the at least one smart field device using an open smart communications protocol.

19. The system of claim 18, wherein the open smart communications protocol is a Foundation Fieldbus protocol.

20. The system of claim 18, wherein the open smart communications protocol is a PROFIBUS protocol.

21. The system of claim 1, wherein the at least one field device is at least one of a temperature sensor, a pressure sensor, a flow rate sensor, a valve and a switch.

22. The system of claim 17, further comprising a computer system communicatively coupled to at least one of the controller and the at least one field device.

23. The system of claim 22, wherein the computer system is adapted to receive data from at least one of the controller and the at least one field device.

24. The system of claim 23, wherein the data includes values associated with at least one measurement performed by the at least one field device, the at least one measurement including at least one of temperature, pressure and flow rate.

25. The system of claim 23, wherein the data includes time that the at least one field device has been in operation.

26. The system of claim 23, wherein the data includes at least one of a position of a valve of the at least one field device and a position of a switch of the at least one field device at various times during an operation of the at least one field device.

27. A method for translating code from one format to another format, comprising to the steps of:

receiving the code from at least one field device in a first format; and translating the received code into a second format when the first format is different than the second format.

28. The method of claim 27, wherein the first format has a format of a first programming language, and the second format has a format of a second programming language.

29. The method of claim 28, wherein the first programming language is a non-Function Block Logic language.

30. The method of claim 29, wherein the non-Function Block Logic language is an IEC 61131-x language.

31. The method of claim 30, wherein the IEC 61131-x language is at least one of a Ladder Logic language, a Sequential Function Chart language, and an Instruction List language.

32. The method of claim 28, wherein the second programming language is a Function Block Logic language.

33. The method of claim 32, wherein the Function Block Logic language is a Foundation Fieldbus Function Block Logic language.

34. The method of claim 33, wherein the first programming language is an IEC 61131-x language.

35. The method of claim 34, wherein the IEC 61131-x language is at least one of a Ladder Logic language, a Sequential Function Chart language, and an Instruction List language.

36. The method of claim 28, further comprising the step of generating a graphical expression of the received code, wherein the graphical expression comprises a plurality of cells, and wherein each of the cells comprises one of a single element and no elements.

37. The method of claim 36, wherein the element is at least one of a line segment and a variable.

38. The method of claim 37, wherein the variable is at least one of an input variable and an output variable.

39. The method of claim 37, further comprising the step of generating a matrix associated with the graphical expression, wherein the step of generating the matrix comprises the substeps of:

replacing first cells which do not include the single element with the number 0, replacing second cells which include the line segment with the number 1, replacing third cells which include a variable that is not vertically connected to another variable with the number 100, and replacing fourth cells which include a variable vertically connected to another variable with a number (N), wherein the number (N) equals to 100 minus a quantity of variables connected to and positioned below the variable that is vertically connected to another variable.

40. The method of claim 39, wherein the first language is a Ladder Logic language.

41. The method of claim 39, further comprising the steps of:

solving the matrix; and translating the received code from the first programming language into the second programming language based on a solution of the matrix.

42. The method of claim 41, wherein the matrix is solved using boolean algebra.

43. The method of claim 27, wherein the at least one field device is a smart field device, and wherein a controller is communicatively coupled to the at least one smart field device using an open smart communications protocol.

44. The method of claim 43, wherein the open smart communications protocol is a Foundation Fieldbus protocol.

45. The method of claim 43, wherein the open smart communications protocol is a PROFIBUS protocol.

46. The method of claim 27, further comprising the step of determining whether the first format is different than the second format.

47. The method of claim 45, wherein the translating step is performed only when the first format is different than the second format.

48. The method of claim 27, wherein the at least one field device is at least one of a temperature sensor, a pressure sensor, a flow rate sensor, a valve and a switch.

49. The method of claim 43, wherein a computer system is adapted to receive data from at least one of the controller and the at least one field device.

50. The method of claim 48, wherein the data includes values associated with at least one measurement performed by the at least one field device, the at least one measurement including at least one of temperature, pressure and flow rate.

51. The method of claim 48, wherein the data includes time that the at least one field device has been in operation.

52. The method of claim 48, wherein the data includes at least one of a position of a valve, and a position of a switch at various times during an operation of the at least one field device.

* * * * *